US009849479B2

(12) United States Patent
Nakamura

(10) Patent No.: US 9,849,479 B2
(45) Date of Patent: Dec. 26, 2017

(54) APPLICATION DEVICE, APPLICATION ROBOT, AND APPLICATION METHOD

(71) Applicant: KABUSHIKI KAISHA YASKAWA DENKI, Kitakyushu-shi (JP)

(72) Inventor: Chiharu Nakamura, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 14/848,244

(22) Filed: Sep. 8, 2015

(65) Prior Publication Data

US 2016/0067732 A1 Mar. 10, 2016

(30) Foreign Application Priority Data

Sep. 9, 2014 (JP) ................................ 2014-183368

(51) Int. Cl.

| | |
|---|---|
| ***B05B 3/00*** | (2006.01) |
| ***B05C 5/02*** | (2006.01) |
| ***B05B 13/04*** | (2006.01) |
| ***B25J 11/00*** | (2006.01) |
| ***B25J 18/00*** | (2006.01) |

(52) U.S. Cl.

CPC ............ *B05C 5/02* (2013.01); *B05B 13/0405* (2013.01); *B05B 13/0431* (2013.01); *B25J 11/0075* (2013.01); *B25J 18/007* (2013.01)

(58) Field of Classification Search

USPC .................................... 118/321, 323; 901/43

See application file for complete search history.

(56) References Cited

U.S. PATENT DOCUMENTS 4,613,082 A * 9/1986 Gimple ..................... B05B 5/03 239/600
2005/0066890 A1* 3/2005 Wetzel .................. B25J 18/005 118/313
2011/0162805 A1* 7/2011 Cheng ........................ B25J 5/02 156/578

FOREIGN PATENT DOCUMENTS

CN 101712157 5/2010
JP 2006-075699 3/2006

OTHER PUBLICATIONS

Chinese Office Action for corresponding CN Application No. 201510535533.4, dated May 4, 2017 (w/ English machine translation).

* cited by examiner

*Primary Examiner* — Yewebdar T Tadesse
(74) *Attorney, Agent, or Firm* — Mori & Ward, LLP

(57) ABSTRACT

An application device includes: a discharger having a discharge port configured to discharge an application material; a first supporter movably supporting the discharger around a position of the discharge port; and a first driver configured to move the discharger supported by the first supporter. An application method, includes: making a central axis of a discharge port coaxial with any rotation axis in an arm portion of an application robot, the discharge port being configured to discharge an application material; and applying the application material to an applied surface while moving a discharger having the discharge port around a position of the discharge port.

16 Claims, 10 Drawing Sheets

5 1 52 51 6 611 61 621a 621 62 4 41 41a 42 25 2 21 24 22 23 AX 31 32 3 Z Y X

APPLICATION DEVICE, APPLICATION ROBOT, AND APPLICATION METHOD

CROSS-REFERENCE TO RELATED APPLICATION

This application claims priority from Japanese Patent Application No. 2014-183368 filed with the Japan Patent Office on Sep. 9, 2014, the entire content of which is hereby incorporated by reference.

BACKGROUND

1. Technical Field

The embodiment of the disclosure relates to an application device, an application robot, and an application method.

2. Description of the Related Art

Typically, there is known an application device that applies application materials such as a sealant and an adhesive to a target object. This application device is, for example, mounted on the tip shaft of a robot as an end effector.

Some application devices thus mounted on robots can control the supply timing of the application material. In the case where this application device is used, while the robot is moved at a constant speed relative to the target object, the timings for the start of supply and the end of supply of the application material is adjusted. This ensures a uniform applied state (for example, see JP-A-2006-75699).

SUMMARY

An application device according to one aspect of an embodiment, includes: a discharger having a discharge port configured to discharge an application material; a first supporter movably supporting the discharger around a position of the discharge port; and a first driver configured to move the discharger supported by the first supporter.

DESCRIPTION OF THE EMBODIMENTS

Figure 1:
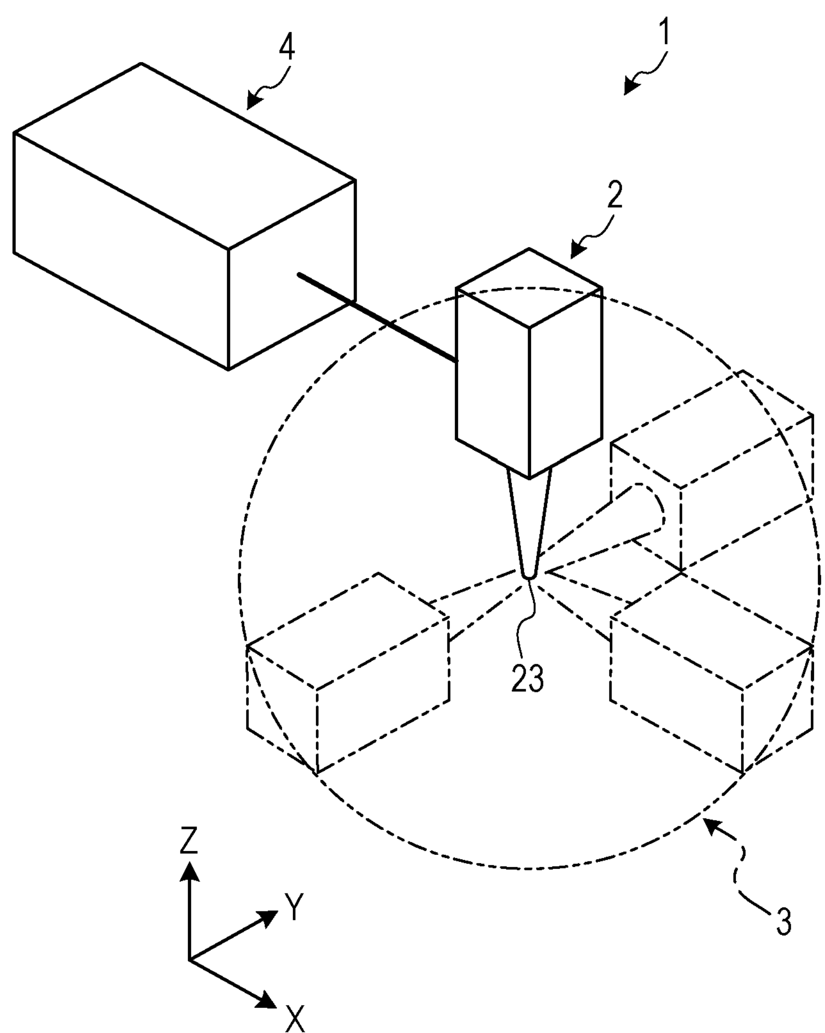
FIG. 1 is an outline explanatory view of an application device according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The following describes the embodiment of an application device, an application robot, and an application method disclosed in this application in detail with reference to the accompanying drawings. Here, the following embodiment does not limit the technique related to this disclosure.

(Application Device)

Firstly, a description will be given of the outline of an application device according to the embodiment with reference to FIG. 1. FIG. 1 is an outline explanatory view of the application device according to the embodiment. Here, in FIG. 1, a coordinate system that includes the X-axis, the Y-axis, and the Z-axis three-dimensionally perpendicular to one another is specified. This coordinate system might be described in other drawings.

For example, the application device described below applies an application material such as an adhesive to an applied surface of a steel plate or the like as a target object.

As illustrated in FIG. 1, an application device 1 includes a discharger 2, a supporter 3, and a driver 4. The discharger 2 has a discharge port 23 for discharging an application material (such as an adhesive). The supporter 3 supports the discharger 2 movably around the position of the discharge port 23. That is, the supporter 3 changes the posture of the discharger 2 while fixing the position of the discharge port 23.

The driver 4 moves the discharger 2 supported by the supporter 3 via the supporter 3. Specifically, the driver 4 has a driving source, which gives a rotary driving force to the discharger 2 to move the discharger 2. Here, this driving source can employ, for example, a servo motor.

As illustrated in FIG. 1, the application device 1 changes the posture of the discharger 2 without changing the position of the discharge port 23. This allows almost constantly keeping the direction of the discharge port 23 perpendicularly to the applied surface. This allows uniformly applying the application material to the applied surface. Here, "uniform" in this description includes not only a completely uniform state, but also a substantially uniform state (such as a state where an uneven application is less obvious).

For example, the application device 1 can almost always keep the direction of the discharge port 23 perpendicularly to the applied surface also in the case where the application material is applied while the discharge port 23 is moved at a certain distance from the applied surface. This allows uniformly applying the application material to the applied surface.

Here, the application device 1 according to an embodiment further includes a coupling portion that couples the output shaft of the driver 4 to the base side of the discharger 2. The coupling portion includes a drive-side member, which is disposed in the driver 4, and a driven-side member, which is disposed in the discharger 2. Furthermore, the drive-side member has an opening, and the driven-side member has a pin. The configurations of these members will be described later using FIGS. 2A, 2B, and 3.

In the application device 1 according to the embodiment, the supporter 3 includes an arc-like first rail, and the discharger 2 slides along the arc-like first rail. The configurations of these members will also be described later using FIGS. 2A, 2B, and 3.

In the application device 1 according to the embodiment, the driver 4 is arranged such that the output shaft of the driver 4 is perpendicular to the central axis of the discharge port 23. The configuration of the driver 4 will also be described later using FIGS. 2A, 2B, and 3.

Here, in the above-described application device 1, the discharger 2 two-dimensionally or three-dimensionally changes its posture around the position of the discharge port 23. For example, as illustrated in FIG. 1, the discharger 2 may be configured to change its posture along a plane parallel to the YZ plane or a plane parallel to the XZ plane around the position of the discharge port 23.

For example, as illustrated in FIG. 1, the discharger 2 may be configured to change its posture along both a plane parallel to the YZ plane and a plane parallel to the XZ plane around the position of the discharge port 23.

Figure 2A:
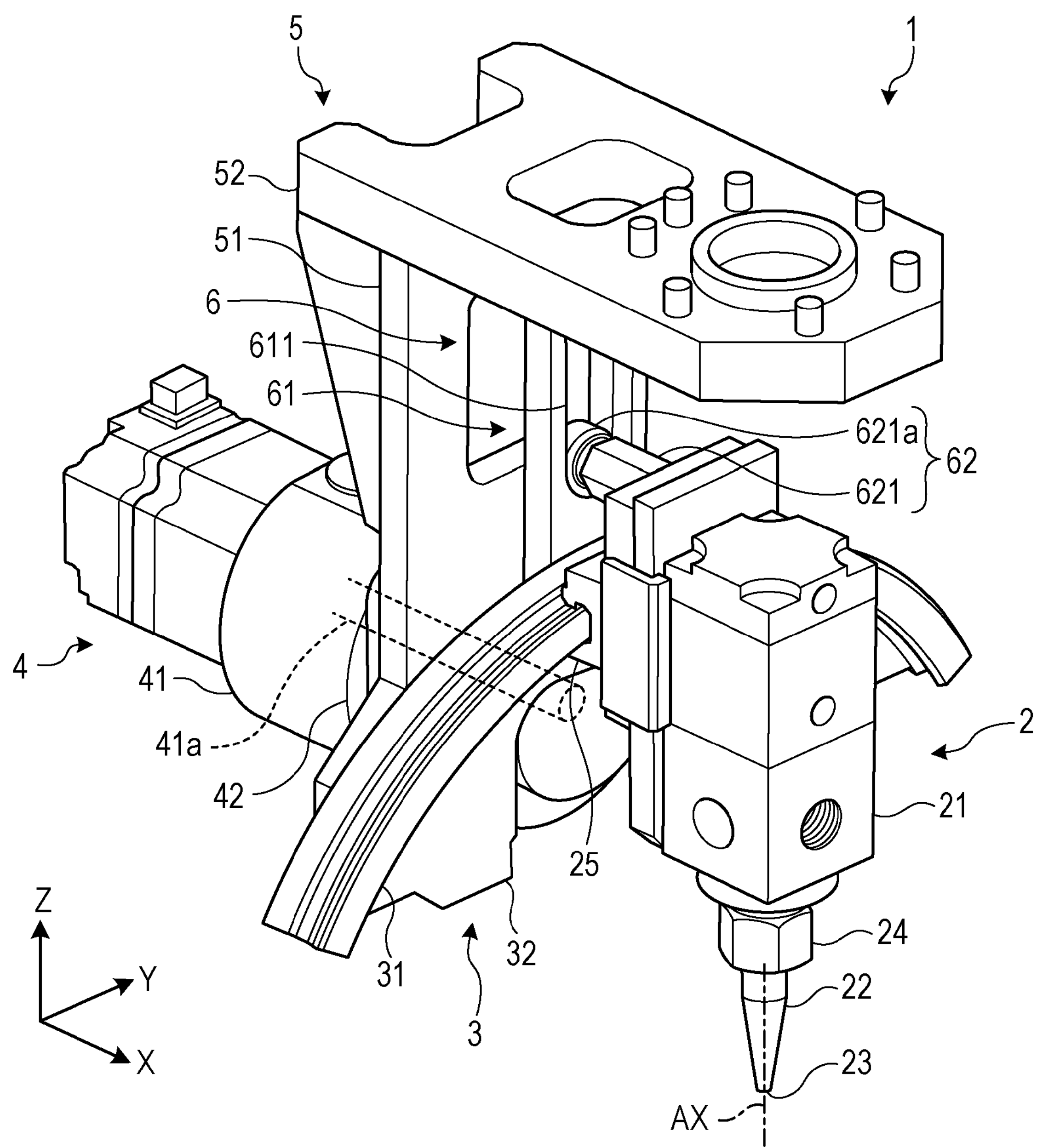
FIG. 2A is a schematic perspective view (first) of the application device.
Figure 2B:
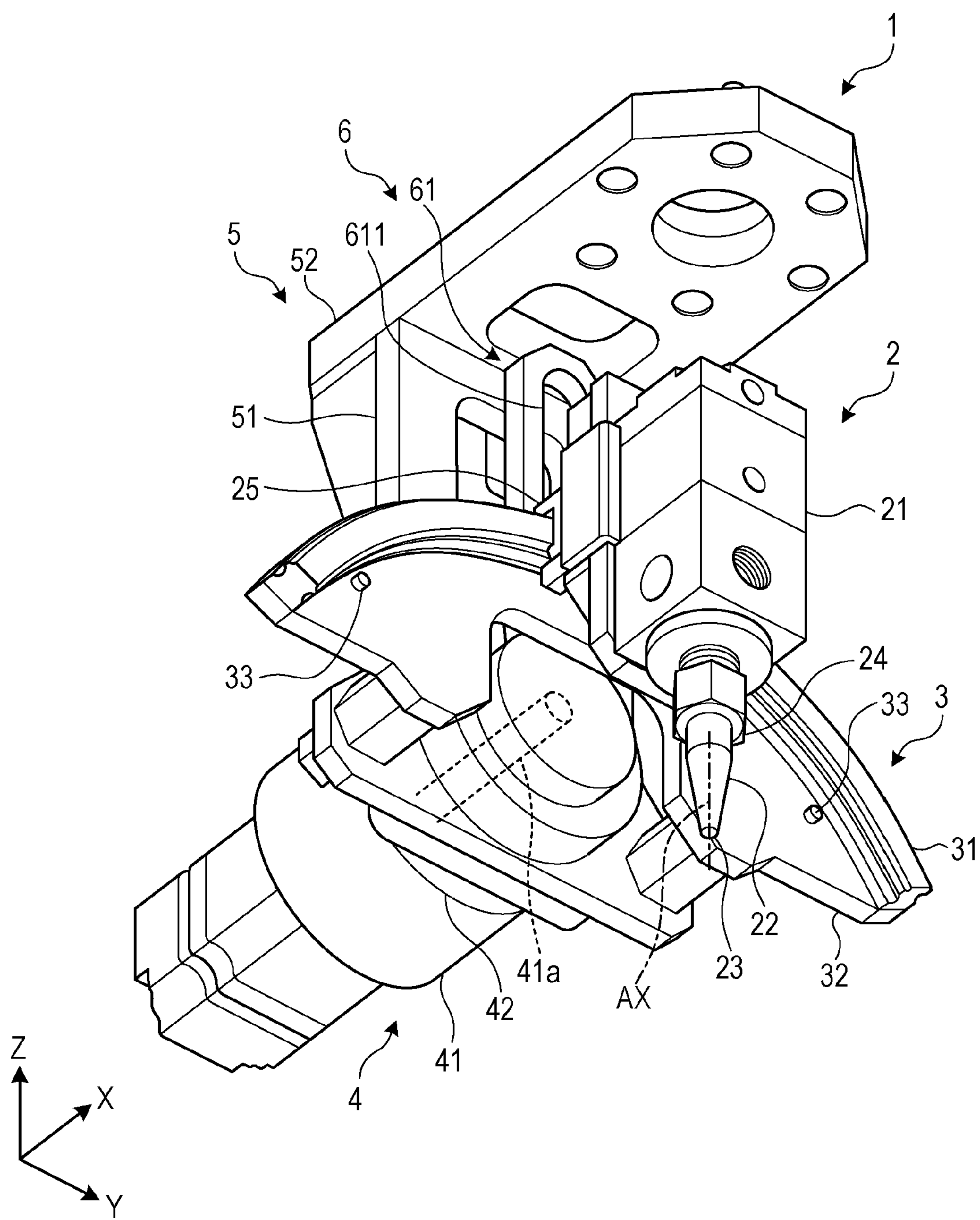
FIG. 2B is a schematic perspective view (second) of the application device.
Figure 3:
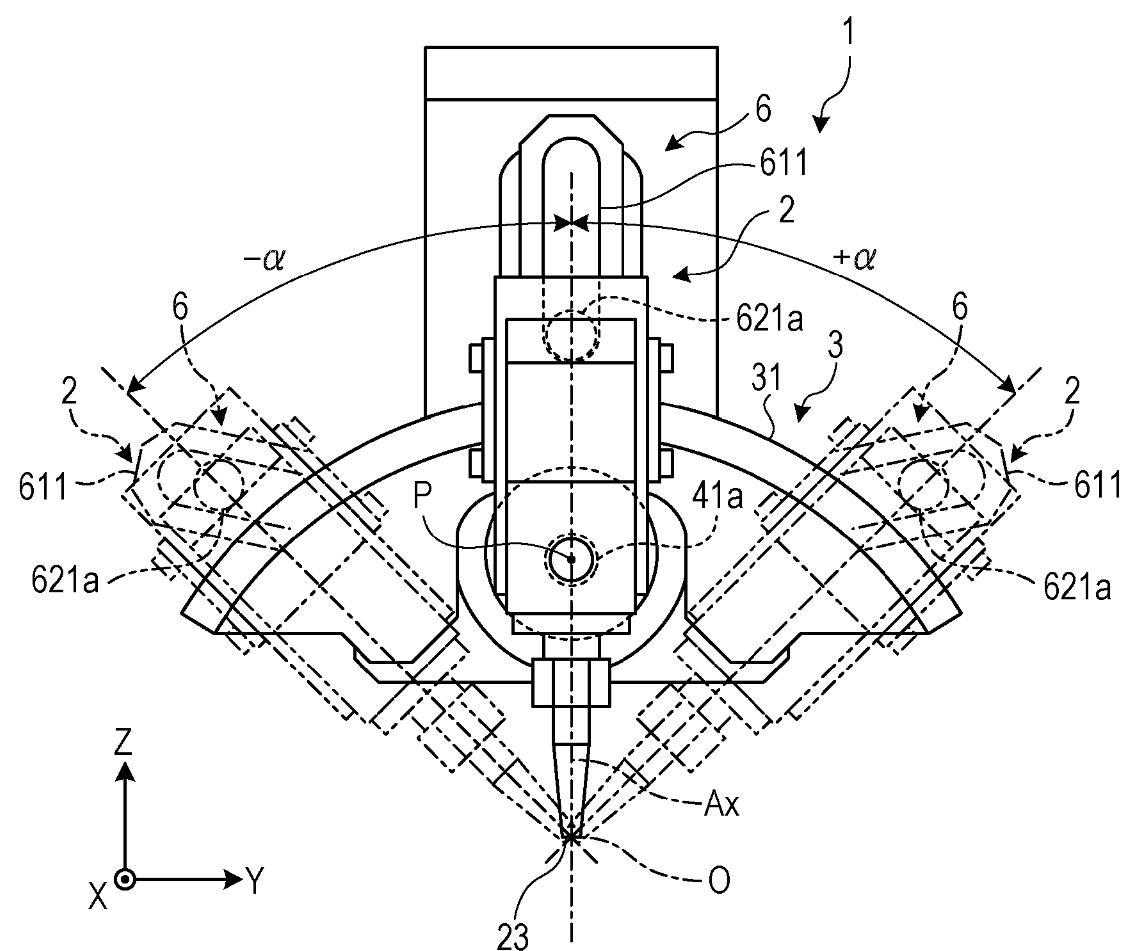
FIG. 3 is an operation explanatory view of the application device.

The following describes the detail of the application device 1 according to the embodiment with reference to FIGS. 2A, 2B, and 3. FIGS. 2A and 2B are schematic perspective views of the application device 1. Here, FIG. 2A is a view of the application device 1 viewed from the upward direction, and FIG. 2B is a view of the application device 1 viewed from the downward direction.

As illustrated in FIGS. 2A and 2B, the discharger 2 includes a main body 21 and a nozzle 22. Into the main body 21, an application material pressure-fed by a pressure feeding pump (not illustrated) is supplied through a temperature adjustment cable (not illustrated) or the like.

Here, between the main body 21 and the pressure feeding pump, for example, a servo pump that can control the supply amount of the application material at high accuracy may be disposed. Here, the servo pump does not perform a pressure control, and thus is less likely to be affected by a viscosity change of the application material in association with a temperature change. Accordingly, in the case where the servo pump is disposed, the cable between the main body 21 and the servo pump can employ an ordinary cable instead of the temperature adjustment cable.

The nozzle 22 is disposed projecting from the main body 21. The tip surface of the nozzle 22 has an opening. This opening becomes the above-described discharge port 23. Hereinafter, in the application device 1, the discharge port 23 side is denoted as a tip side while the opposite side of the nozzle 22 side of the main body 21 is denoted as a base side.

On the base side of the nozzle 22, a valve 24, which opens and closes to switch between discharge and non-discharge of the application material, is disposed. Here, the open-and-close control of the valve 24 is performed by an application controller (not illustrated).

On the base side of the discharger 2, that is, in the main body 21, a slider 25 is disposed. The slider 25 slidably couples the main body 21 to a rail 31 (the first rail) of the supporter 3 described later. The slider 25 holds the rail 31, and has the freedom degree of operation along an arc direction corresponding to the curvature of the rail 31. Furthermore, in the main body 21, a pin 621, which constitutes a coupling portion 6 described later, is disposed projecting to the X-axis negative direction side. Here, the pin 621 has, on its tip, a roller 621*a*. Here, the roller 621*a* may be omitted while a rotatable pin is disposed in the main body.

As illustrated in FIGS. 2A and 2B, the supporter 3 includes the rail 31 and a stationary plate 32. The rail 31 is formed in an arc shape extending along the plane parallel to the YZ plane. The rail 31 has a central angle of a predetermined angle while the position of the discharge port 23 in the discharger 2 positioned at the center of the rail 31 is the center (0 degrees). The central angle of the rail 31 is preferred to be, for example, around 90 degrees. In the example of the illustration, the rail 31 has a central angle of $-\alpha$ degree to $+\alpha$ degree while the position of the discharge port 23 is 0 degrees. Here, the central angle of the rail 31 may be an angle smaller than 90 degrees and may be an angle larger than 90 degrees.

The stationary plate 32 is formed in an approximately fan shape. The rail 31 is secured to the X-axis positive direction side of the end edge of the arc shape in the stationary plate 32. The X-axis negative direction side of the stationary plate 32 is secured to a mounting portion 5 described later.

The supporter 3 supports the discharger 2 slidably in the extending direction of the rail 31. As illustrated in FIG. 2B, the supporter 3 includes protrusions 33 and 33 to be stoppers that restrict the movement of the discharger 2.

As illustrated in FIGS. 2A and 2B, the driver 4 is disposed on the X-axis negative direction side of the supporter 3. The driver 4 includes a driving source 41 and a reducer 42. The driving source 41 is, for example, a servo motor, and includes an output shaft 41*a*. The driving source 41 is arranged to have the direction of the output shaft 41*a* in the direction perpendicular to a central axis AX of the discharge port 23.

Here, the central axis AX of the discharge port 23 is the line extending in the axial direction of the nozzle 22, and is the line passing through the center of the discharge port 23. The reducer 42 is arranged coaxially with the driving source 41 on the X-axis positive direction side of the driving source 41.

As illustrated in FIGS. 2A and 2B, the application device 1 further includes the mounting portion 5 and the coupling portion 6. The mounting portion 5 is secured to the supporter 3 and the driver 4. The mounting portion 5 includes an upright plate 51 and a top plate 52. The upright plate 51 is disposed between the supporter 3 and the driver 4. To the X-axis positive direction side of the upright plate 51, the stationary plate 32 of the supporter 3 is secured. The X-axis negative direction side of the upright plate 51 is secured to the reducer 42 of the driver 4. Furthermore, the upright plate 51 has a through-hole (not illustrated) that causes passage of the output shaft 41*a*.

The top plate 52 is disposed on one end face of the upright plate 51 perpendicularly to the upright plate 51. The top plate 52 is, for example, mounted on the tip (the end effector) of an application robot 10 described later.

As illustrated in FIGS. 2A and 2B, the coupling portion 6 includes a drive-side member 61 and a driven-side member 62. The drive-side member 61 is formed in a plate shape extending along the upright plate 51 of the mounting portion 5. The drive-side member 61 is disposed between the main body 21 and the upright plate 51. To the one end side of the drive-side member 61, the output shaft 41*a* of the driving source 41 is coupled. The drive-side member 61 pivots around the axis of the output shaft 41*a* in conjunction with the rotation of the output shaft 41*a*. The driven-side member 62 has the pin 621 and the roller 621*a* described above.

The drive-side member 61 has an opening 611. The opening 611 has an elongated hole shape extending in the central axis AX direction (the Z-axial direction in FIGS. 2A and 2B) of the discharge port 23. The opening 611 allows insertion of the roller 621*a* disposed on the tip of the pin 621. In the coupling portion 6, a rotary driving force from the driver 4 is transmitted between the drive-side member 61 and the driven-side member 62.

In the case where the driven-side member 62 follows the drive-side member 61, the opening 611 allows movement of the roller 621*a* in the extending direction of the opening 611 and allows axial rotation of the roller 621*a*.

Here, the operation of the application device 1 will be described with reference to FIG. 3. FIG. 3 is an operation explanatory view of the application device 1. Here, in FIG. 3, for convenience of explanation, the portions not related to the operation of the application device 1 are partially omitted. As illustrated in FIG. 3, the discharger 2 slides along the rail 31 of the supporter 3.

When the output shaft 41*a* of the driver 4 (see FIGS. 2A and 2B) rotates, the coupling portion 6 pivots along the plane parallel to the YZ plane in conjunction with the output shaft 41*a*. Pivoting of the coupling portion 6 causes sliding of the discharger 2 along the rail 31 via the pin 621. Here, a pivoting center P of the coupling portion 6 is disposed coaxially with the output shaft 41*a*. The discharger 2 has a rotational center O in the position of the discharge port 23. Accordingly, as described above, the position of the discharge port 23 does not move.

As described above, the moving range of the discharger 2 is restricted to a predetermined angle (preferably about 90 degrees). In the application device 1, the discharger 2 moves along the plane parallel to the ZY plane within the range of the predetermined angle while the state positioned at the center of the rail 31 is the reference (0 degrees). Here, FIG. 3 illustrates the discharger 2 after moving and the coupling portion 6 (the opening 611 and the roller 621*a*) by two-dot chain lines.

As illustrated in FIG. 3, in the case where the discharger 2 is the reference position (the position of 0 degrees), the roller 621*a* of the pin 621 (see FIG. 2A) abuts on one end edge of the opening 611. Pivoting of the coupling portion 6 in any of the positive direction or the negative direction of the Y-axis causes turning of the discharger 2 in the identical direction in conjunction with the coupling portion 6.

For example, when the discharger 2 rotates by +a degree (a degree to the Y-axis positive direction side), the main body 21 abuts on the protrusion 33 (see FIG. 2B) on one side as the stopper. For example, when the discharger 2 rotates by $-\alpha$ degree ($\alpha$ degree to the Y-axis negative direction side), the main body 21 abuts on the protrusion 33 (see FIG. 2B) on the other side. This configuration allows restricting the movement of the discharger 2 within the predetermined range.

The rotational center O of the discharger 2 and the pivoting center P of the coupling portion 6 are arranged in mutually different positions on the central axis AX of the discharge port 23. For example, when the pivoting center P of the coupling portion 6 is arranged in the position of the rotational center O of the discharger 2, the output shaft 41*a* of the driver 4 is arranged on the rotational center O. This interferes with discharge of the application material by the discharge port 23.

Therefore, the rotational center O of the discharger 2 and the pivoting center P of the coupling portion 6 are arranged in the mutually different positions on the central axis AX of the discharge port 23. Because the two centers O and P are arranged in the mutually different positions, the rotation locus of the discharger 2 and the rotation locus of the coupling portion 6 are different from each other. Therefore, the opening 611 of the coupling portion 6 has an elongated hole shape. With the elongated hole shape of the opening 611, the opening 611 allows the difference in rotation locus between the discharger 2 and the coupling portion 6.

Specifically, pivoting of the coupling portion 6 causes linear motion of the roller 621*a* of the pin 621 (see FIG. 2A) in the extending direction of the opening 611 within the moving opening 611. Furthermore, the roller 621*a* axially rotates within the opening 611. Accordingly, the opening 611 allows the pin 621 to follow its own rotation without blocking its own rotation by the pin 621.

The application device 1 according to the above-described embodiment allows changing the posture of the discharger 2 without changing the position of the discharge port 23. This allows almost always keeping the direction of the discharge port 23 perpendicularly to the applied surface. This allows uniformly applying the application material.

The discharger 2 slides along the arc-like rail 31. This allows changing the posture of the discharger 2 around the position of the discharge port 23 while fixing the position of the discharge port 23. Furthermore, the central angle of the rail 31 is set to about 90 degrees. Accordingly, for example, in the case where the application device 1 is mounted on the application robot 10 (see FIG. 6), the application device 1 and the application robot 10 can efficiently collaborate with each other.

The driver 4 is arranged such that the output shaft 41*a* is perpendicular to the central axis AX of the discharge port 23. This facilitates the movement control of the discharger 2 and ensures a compact configuration of the application device 1.

Between the driver 4 and the discharger 2, the coupling portion 6 is disposed. This allows the discharger 2 to slide along the rail 31 while fixing the supporter 3.

Here, in the application device 1 according to the above-described embodiment, the coupling portion 6 is configured such that the drive-side member 61 has the opening 611 and the driven-side member 62 has the pin 621. However, the configuration of the coupling portion 6 is not limited to this. For example, the discharger 2 may include a fixed pinion as the drive-side member 61 and an arc-like rack as the driven-side member 62. With this configuration, the pinion rotates by the rotary driving force of the output shaft 41*a*. The rack is moved in its extending direction by rotation of the pinion. Mounting the discharger 2 on this rack allows changing the posture of the discharger 2 around the position of the discharge port 23. This simplifies the structure of the coupling portion 6.

In the application device 1 according to the above-described embodiment, the protrusions 33 and 33 are disposed as the stoppers of the discharger 2 in the vicinity of both ends of the rail 31. Instead, for example, the opening 611 and the pin 621 may be configured to have stopper functions. With this configuration, for example, the pin 621 (the roller 621*a*) abuts on both end edges of the opening 611 of the drive-side member 61 so as to restrict the sliding range of the discharger 2 to a predetermined angle. This configuration allows the opening 611 and the pin 621 to also function as the stoppers, without disposing the protrusion 33 and 33. Alternatively, use of the combination of this configuration and the stoppers by the protrusions 33 and 33 allows doubly restricting the sliding range of the discharger 2.

In the application device 1 according to the above-described embodiment, the supporter 3 is configured to have the rail 31, which allows sliding of the discharger 2. However, the configuration of the supporter 3 is not limited to this. For example, an arc-like rack may be disposed in the supporter 3 while the driven-side member 62 of the coupling portion 6 has a pinion. This configuration allows a movement control of the discharger 2 at high accuracy.

For example, the supporter 3 may include a ball screw for moving the discharger 2. This configuration also allows a movement control of the discharger 2 at high accuracy.

In the application device 1 according to the above-described embodiment, the discharger 2 is configured to slide on one rail 31 so as to two-dimensionally change its posture. Instead, for example, the supporter 3 may further include a second rail intersecting with the rail 31. This allows three-dimensionally changing the posture of the discharger 2.

The following describes an example of the three-dimensional change of the posture of the discharger 2 with reference to FIGS. 4A to 5B.

Figure 4A:
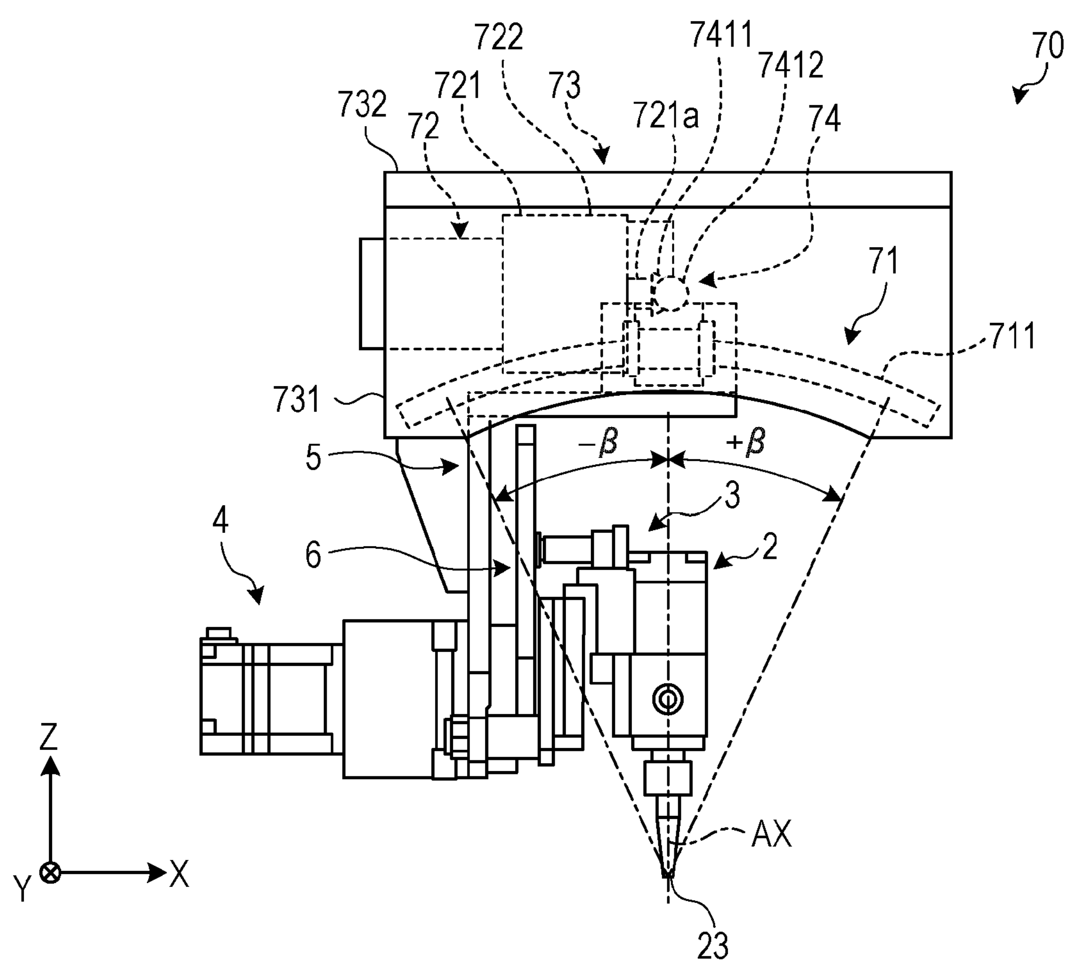
FIG. 4A is a schematic side view of another example of the application device.
Figure 4B:
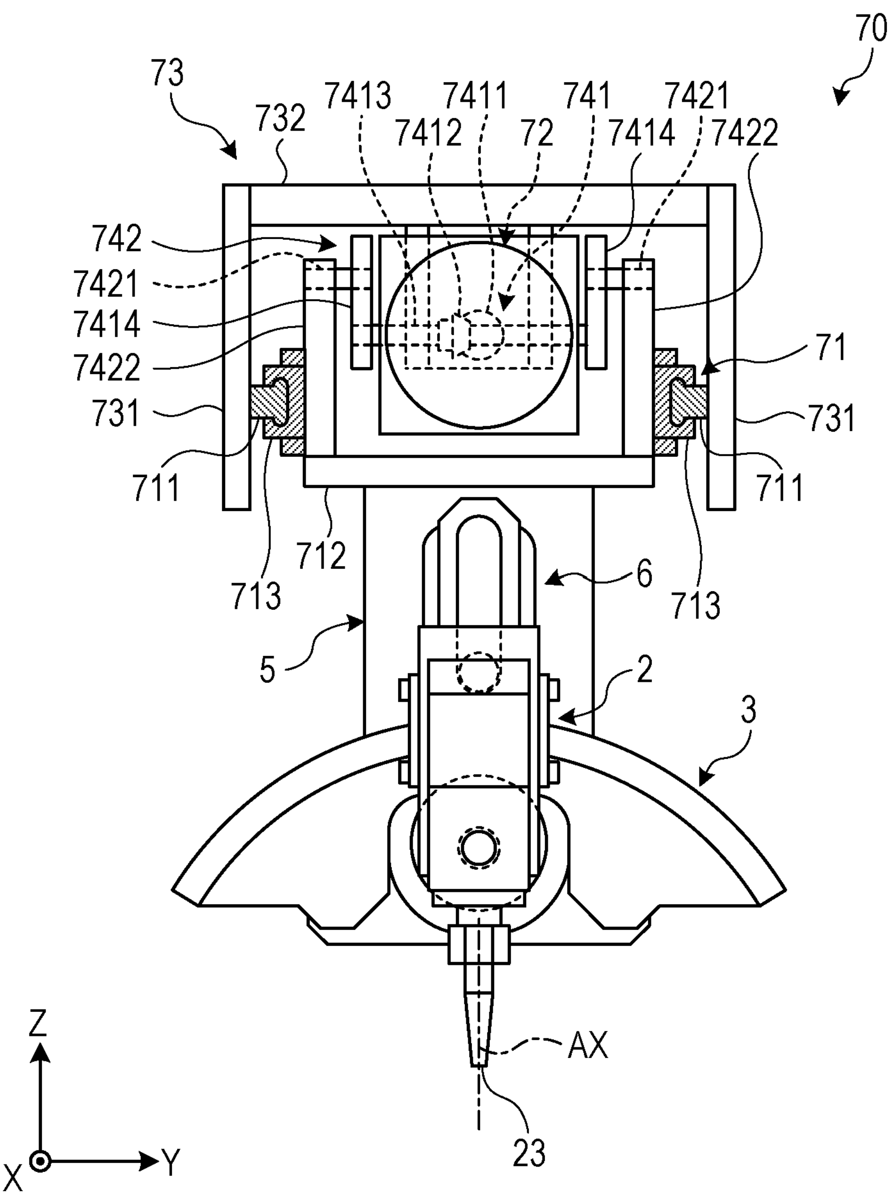
FIG. 4B is a schematic front view of the other example of the application device.
Figure 5A:
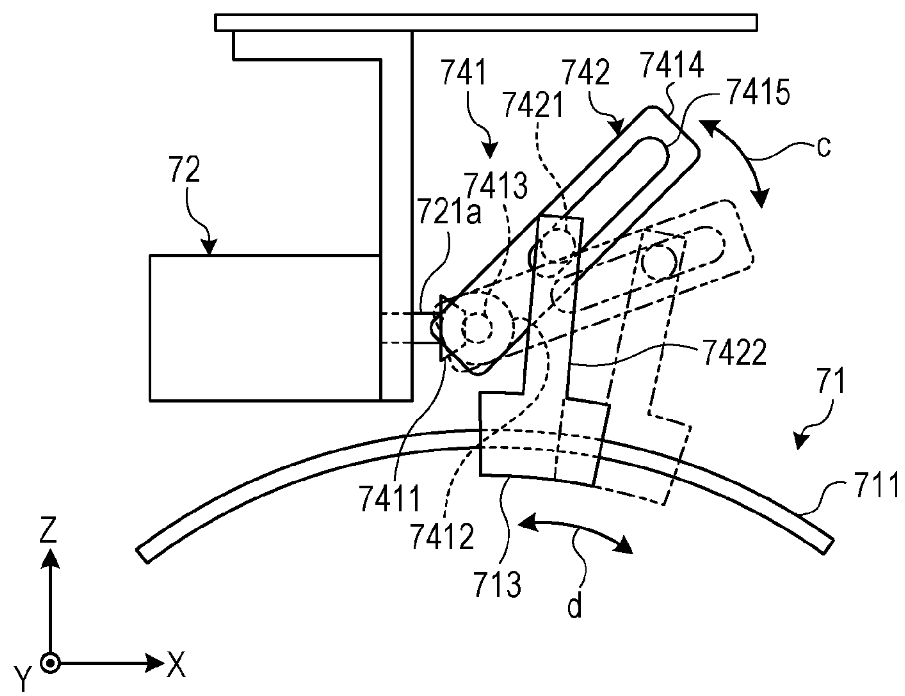
FIG. 5A is an operation explanatory view (first) of the other example of the application device.
Figure 5B:
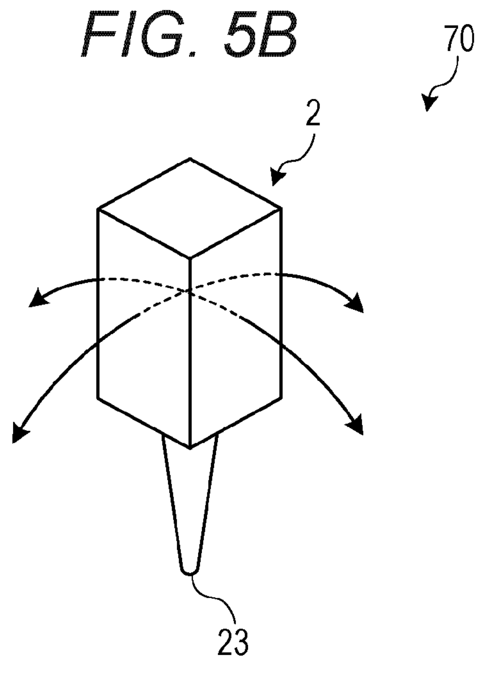
FIG. 5B is an operation explanatory view (second) of the other example of the application device.

FIG. 4A is a schematic side view of another example of the application device. FIG. 4B is a schematic front view (a partial cross-sectional view) of the other example of the application device. FIGS. 5A and 5B are operation explanatory views of the other example of the application device. Here, the points different from the application device 1 according to the above-described embodiment will be described and the overlapping explanation will be omitted below.

As illustrated in FIGS. 4A and 4B, an application device 70 further includes a second supporter 71, a second driver 72, a second mounting portion 73, and a second coupling portion 74 in addition to the discharger 2, the supporter (the first supporter) 3, the driver (the first driver) 4, the mounting portion (the first mounting portion) 5, and the coupling portion (the first coupling portion) 6 described above.

The second supporter 71 is coupled to the first mounting portion 5 via the second coupling portion 74 described later. The second supporter 71 has a pair of arc-like second rails 711 and 711 (see FIG. 4B). This second rail 711 extends in the direction (the X-axial direction) perpendicular to the rail 31 (see FIGS. 2A and 2B) of the first supporter 3. Here, the pair of second rails 711 and 711 is disposed on a pair of upright plates 731 and 731 (see FIG. 4B) of the second mounting portion 73 described later. The second rail 711 is constituted to support the mounting portion 5 movably around the position the discharge port 23.

As illustrated in FIG. 4B, the second supporter 71 includes a support base 712 and a pair of sliders 713 and 713. The first mounting portion 5 is mounted on the support base 712. Accordingly, the support base 712 supports the discharger 2, the first supporter 3, the first driver 4, and the first coupling portion 6 via the first mounting portion 5.

The pair of sliders 713 and 713 is disposed on coupling plates 7422 and 7422 of a driven-side member 742 described later to hold the pair of the respective second rails 711 and 711. The pair of sliders 713 and 713 has the respective freedom degrees of operation along the arc directions corresponding to the curvatures of the pair of second rails 711 and 711 (see FIG. 4A).

The second driver 72 moves (slides) the first mounting portion 5 along the second rail 711. That is, the second driver 72 moves the discharger 2, the first supporter 3, the first driver 4, and the first coupling portion 6 via the first mounting portion 5.

As illustrated in FIG. 4A, the second driver 72 is disposed on the X-axis negative direction side of the supporter 3, similarly to the above-described first driver 4. The second driver 72 includes a driving source 721 and a reducer 722. The driving source 721 is, for example, a servo motor, and includes an output shaft 721*a*. The driving source 721 is arranged to have the direction of the output shaft 721*a* in the direction perpendicular to the central axis AX of the discharge port 23. On the tip of the output shaft 721*a*, a first bevel gear 7411 of a drive-side member 741 (see FIG. 4B) described later is disposed.

The second mounting portion 73 includes the pair of upright plates 731 and 731 and a top plate 732. To the pair of upright plates 731 and 731, the second driver 72 is secured. The top plate 732 is disposed on respective one end faces of the upright plates 731 and 731 perpendicularly to the pair of upright plates 731 and 731. The top plate 732 is, for example, mounted on the tip (the end effector) of the application robot 10 described later.

As illustrated in FIG. 4B, the second coupling portion 74 includes the drive-side member 741 and the driven-side member 742. The drive-side member 741 includes the first bevel gear 7411, a second bevel gear 7412, another output shaft 7413, a plate body 7414, and an opening 7415. As described above, the first bevel gear 7411 is disposed on the tip of the output shaft 721*a*. The second bevel gear 7412 engages with the first bevel gear 7411, and is disposed on the other output shaft 7413.

The other output shaft 7413 is arranged perpendicularly to the output shaft 721*a* along the Y-axis direction. Both ends of the other output shaft 7413 are secured to the plate body 7414. The plate body 7414 has the opening 7415 in the elongated hole shape. Here, the details of the plate body 7414 and the opening 7415 will be described later using FIG. 5A.

As illustrated in FIG. 4B, the driven-side member 742 includes two pins 7421 and 7421 and the pair of coupling plates 7422 and 7422. One end side of the pin 7421 is secured to the coupling plate 7422. Furthermore, the other end side of the pin 7421 is inserted through the opening 7415 of the plate body 7414. On the outer surface of the coupling plate 7422, the slider 713 is disposed.

Here, the operations of the drive-side member 741 and the driven-side member 742 will be described with reference to FIG. 5A. As illustrated in FIG. 5A, the rotary driving force output from the second driver 72 is transmitted to the other output shaft 7413 perpendicular to the output shaft 721*a* by engagement between the first bevel gear 7411 and the second bevel gear 7412.

When the other output shaft 7413 rotates, for example, the opposite side (the tip side) to the side to which the other output shaft 7413 is secured in the plate body 7414 formed in an approximately rectangular shape swings in an arrow line c direction. For example, when the plate body 7414 swings from the position illustrated by a two-dot chain line to the position illustrated by a solid line in FIG. 5A, the pin 7421 slides along the opening 7415 in the elongated hole shape extending in the longitudinal direction of the plate body 7414.

Furthermore, when the pin 7421 swings from the position illustrated by a two-dot chain line to the position illustrated by a solid line in FIG. 5A, the slider 713 moves in the arc direction (an arrow line d direction) of the second rail 711 along the second rail 711 of the second supporter 71 via the coupling plate 7422 to which the pin 7421 is secured.

As just described, the second coupling portion 74 is disposed between the second supporter 71 and the second driver 72 to transmit the rotary driving force from the second driver 72 to the second mounting portion 73. For example, the second coupling portion 74 has the combination of a gear such as a bevel gear and a link mechanism, and converts the rotary driving force of the output shaft 721*a* of the second driver 72 into a linear driving force.

That is, the second supporter 71 allows moving the discharger 2 in the extending direction of the second rails 711 and 711 via the first mounting portion 5. Accordingly, the discharger 2 can move around the position of the discharge port 23 in the X-axial direction within a predetermined range. In the example of FIG. 4A, the discharger 2 can move within a range of −β degree to +β degree while the position of the discharge port 23 is the center (0 degrees).

Accordingly, as illustrated in FIG. 5B, in the application device 70, the discharger 2 moves both in the X-axial direction and the Y-axis direction around the position of the discharge port 23. That is, the discharger 2 can freely three-dimensionally change its posture.

The above-described application device 70 changes the posture of the discharger 2 without changing the position of the discharge port 23. This allows almost always keeping the direction of the discharge port 23 perpendicularly to the applied surface. This allows uniformly applying the application material to the applied surface.

The first mounting portion 5 slides along the arc-like second rail 711. This allows changing the posture of the discharger 2 around the position of the discharge port 23 via the first mounting portion 5 while fixing the position of the discharge port 23. In addition to the central angle of the rail 31 (see FIGS. 2A and 2B) of the first supporter 3, setting the central angle of the second rail 711 of the second supporter 71 to the predetermined angle (preferably about 50 degrees) allows the application device 70 and the application robot 10 (see FIG. 6) to efficiently collaborate with each other.

(Application Robot and Application Method)

Figure 6:
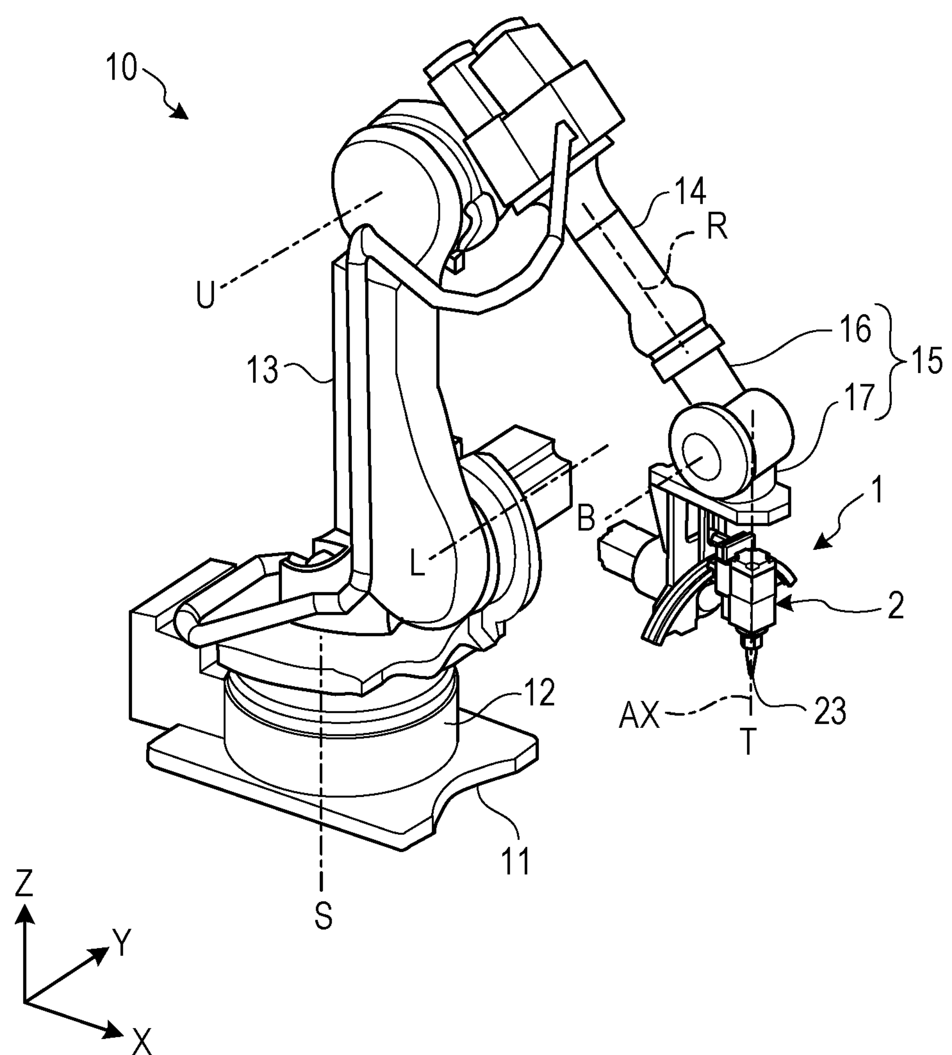
FIG. 6 is a schematic perspective view of an application robot according to the embodiment.

The following describes an application robot according to the embodiment with reference to FIG. 6. FIG. 6 is a schematic perspective view of the application robot according to the embodiment. Here, the application robot described below is what is called an articulated robot that is a single-arm robot.

As illustrated in FIG. 6, the application robot 10 has a pivot base 12. The pivot base 12 is mounted on a base 11, which is installed on the floor surface or the like, pivotally around the vertical axis (an axis S). On the pivot base 12, an arm portion is mounted. On the tip of the arm portion, the application device 1 is mounted. The arm portion includes a lower arm 13, an upper arm 14, and a wrist portion 15. The lower arm 13 is pivotally supported on the pivot base 12 to be rotatable around the horizontal axis (an axis L).

On the upper end of the lower arm 13, the upper arm 14 is pivotally supported to be rotatable around the horizontal axis (an axis U). Furthermore, on the tip of the upper arm 14, the wrist portion 15 is mounted to be rotatable around the longitudinal central axis (an axis R) of the upper arm 14.

The wrist portion 15 includes a swinging body 16 and a rotator 17. The swinging body 16 is pivotally supported to be rotatable around the axis (an axis B) perpendicular to the axis R, and swings. The rotator 17 rotates around the rotation axis (an axis T) on the tip of the swinging body 16.

On the tip of the rotator 17, the application device 1 is mounted such that the axis T, which is the rotation axis of the tip shaft (the tip shaft of the arm portion) of the application robot 10, is coaxial with the central axis AX of the discharge port 23 in the state where the discharger 2 is in the reference position.

Figure 7A:
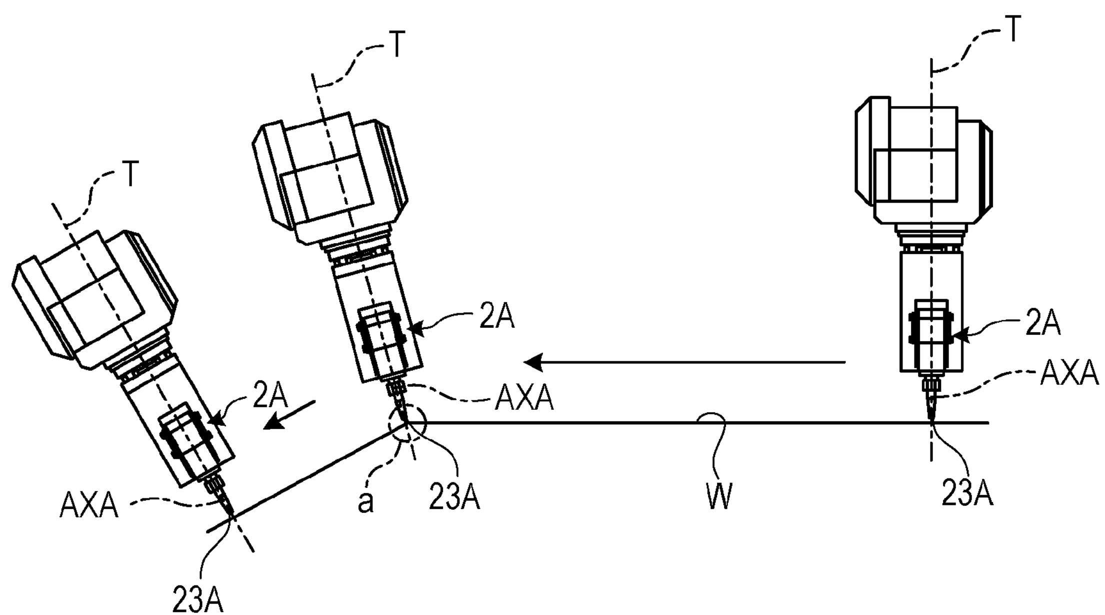
FIG. 7A is an explanatory view of a typical application operation.
Figure 7B:
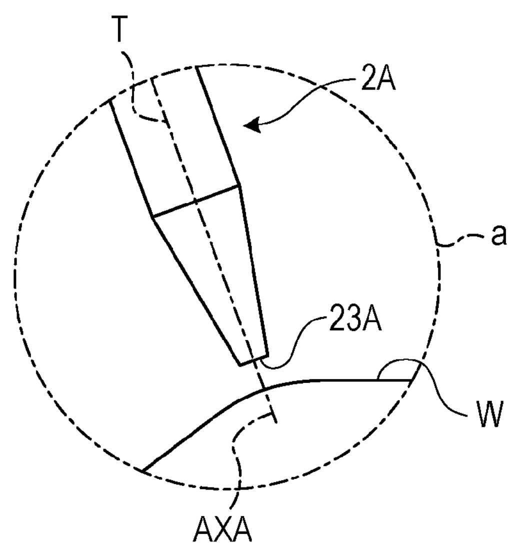
FIG. 7B is an enlarged view of a portion a in FIG. 7A.
Figure 8A:
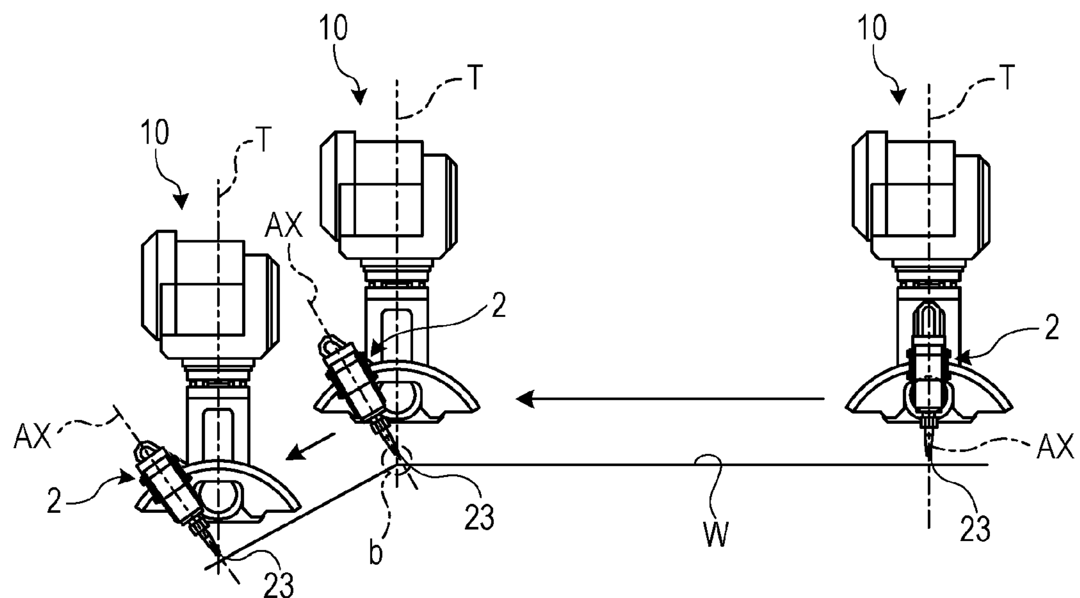
FIG. 8A is an explanatory view of the application operation.
Figure 8B:
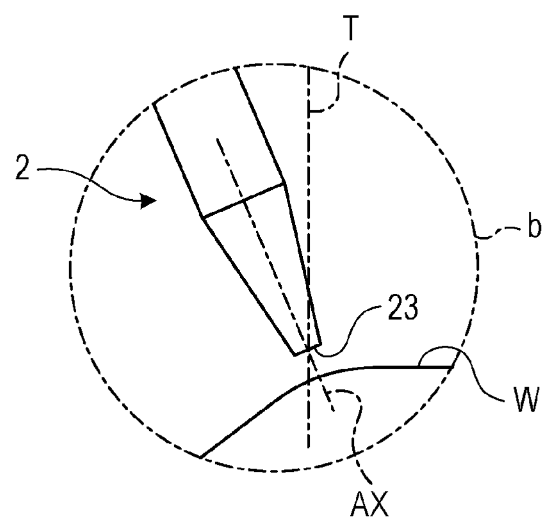
FIG. 8B is an enlarged view of a portion b in FIG. 8A.

The following describes the application operation of the application robot 10 with reference to FIGS. 7A to 8B. FIG. 7A is an explanatory view of a typical application operation. FIG. 7B is an enlarged view of a portion a in FIG. 7A. FIG. 8A is an explanatory view of the application operation. FIG. 8B is an enlarged view of a portion b in FIG. 8A.

Here, in the case where an application process is performed using the application robot 10 (see FIG. 6), the application robot 10 applies the application material on the applied surface of a target object (hereinafter referred to as a workpiece) W along a preliminarily set working line. The application robot 10 applies the application material while almost always keeping a constant distance of the discharge port 23, which discharges the application material, from the applied surface of the workpiece W.

Here, as illustrated in FIG. 7A, typically, the axis T of the application robot always coincides with a central axis AXA of a discharge port 23A. For example, in the case where the application robot applies the material on the applied surface of the workpiece W while causing the discharger 2A to operate in the arrow line direction, the discharge port 23A is kept perpendicular to the applied surface to stabilize the bead shape. The working speed (the moving speed of the discharger 2A) is kept constant.

As illustrated in FIG. 7B, in the case where the applied surface is a curved surface or an inclined surface, typically, the application robot inclines the axis T while always changing its posture so as to keep the discharge port 23A perpendicular to the applied surface.

However, in the portion a in FIG. 7A, the posture (the direction) of the axis T is promptly changed to keep the discharge port 23A perpendicular to the surface of the workpiece W. In the above-described typical application robot, the respective axes of the application robot are operated to change the posture of the application robot so as to change the direction of the axis T. However, a large speed change might occur in the vicinity of the portion a due to the influence of the axis (the axis receiving a large load) whose operation is slow.

Usually, not only in the example illustrated in FIG. 7A, but in the application robot where the direction of the discharge port coincides with the axis T, it can be said that a speed change is likely to occur when the posture of the discharge port is changed.

As illustrated in FIG. 8A, for example, the application robot 10 operates such that the application device 1 causes the discharger 2 to change its posture around the position of the discharge port 23 even when the applied surface is changed from a flat portion into a curved surface in the case where the application robot 10 applies the material on the applied surface of the workpiece W while moving the discharger 2 in the arrow line direction.

That is, in the application robot 10, one operation axis is substantially added. Accordingly, the application robot 10 has redundancy of degree of freedom. This allows the application robot 10 to operate to reduce the operations of the respective axes while avoiding the posture of the discharge port 23 to be a singular point.

In the application robot 10, the added operation axis of the application device is a mechanism for changing the posture of the discharge port 23 without changing the position of the discharge port 23. Accordingly, the application robot 10 also has an advantage that facilitates teaching of operations compared with a robot having general redundancy of degree of freedom.

Accordingly, as illustrated in FIG. 8B, the application robot 10 can keep the angle of the central axis AX of the discharge port 23 as the angle perpendicular to the applied surface without inclining the axis T. That is, the discharge port 23 can be kept perpendicular to the applied surface. The application robot 10 need not incline the axis T to maintain the direction of the discharge port 23 relative to the applied surface. Accordingly, the application robot 10 causes the discharger 2 having a high responsivity, that is, operating quickly to mainly operate, so as to allow keeping the working speed (the moving speed of the discharger 2) approximately constant.

The application robot 10 according to the above-described embodiment changes the posture of the discharger 2 without changing the position of the discharge port 23. This allows almost always keeping the direction of the discharge port 23 perpendicularly to the applied surface. This allows uniformly applying the application material to the applied surface.

The application robot 10 has redundancy of degree of freedom because one operation axis is added. Accordingly, the application robot 10 can operate at an approximately constant working speed. Accordingly, the application robot 10 can uniformly apply the application material to the applied surface.

Here, the application device 1 is mounted on the application robot 10 according to the above-described embodiment such that the central axis AX of the discharge port 23 is coaxial with the axis T. However, the mounted form of the application device 1 is not limited to this. For example, the application device 1 may be mounted on the application robot 10 such that the central axis AX of the discharge port 23 is coaxial with the axis R. With this configuration, similarly to the case where the central axis AX of the discharge port 23 is coaxial with the axis T, one operation axis is added to the application robot 10. Accordingly, also with this configuration, the application robot 10 has redundancy of degree of freedom and thus can operate at an approximately constant working speed. That is, in the application robot 10, the central axis AX of the discharge port 23 is preferred to coincide with any rotation axis (operation axis) in the arm portion.

The application method according to the above-described embodiment includes: making the central axis AX of the discharge port 23, which discharges the application material, coaxial with the axis T of the tip shaft of the atm portion of the application robot 10; and applying the application material to the applied surface while moving the discharger 2 having the discharge port 23 around the position of the discharge port 23. This application method almost always keeps the direction of the discharge port 23 perpendicular to the applied surface in the application process. Accordingly, this application method includes this application process so as to allow uniformly applying the application material to the applied surface.

In the above-described embodiment, the description is given of the case where the bead is the round bead. Accordingly, the discharge port 23 is kept perpendicular to the applied surface. However, the bead is not limited to the round bead. For example, in the case where the bead is a triangular bead, the central axis of the discharge port 23 is slightly inclined to have a certain angle to the applied surface of the workpiece W.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

The embodiment of this disclosure may be the following first to seventh application devices, first application robot, and first application method.

A first application device includes: a discharger having a discharge port that discharges an application material; a supporter that movably supports the discharger around the position of the discharge port; and a driver that moves the discharger supported by the supporter.

A second application device according to the first application device further includes a coupling portion that couples the output shaft of the driver to the base side of the discharger.

In a third application device according to the first or second application device, the supporter has an arc-like rail. The discharger has the base side supported by the rail and slides along the rail.

In a fourth application device according to the third application device, the supporter has another arc-like rail that movably supports the rail. The rail slides along the other rail.

In a fifth application device according to any one of the first to fourth application devices, the coupling portion includes: a drive-side member coupled to the output shaft of the driver; and a driven-side member disposed on the base side of the discharger. A power is transmitted between the drive-side member and the driven-side member.

In a sixth application device according to the fifth application device, the drive-side member has an opening extending in the direction perpendicular to the output shaft of the driver. The driven-side member has a rotatably supported pin. The pin is inserted into the opening and linearly moves along the opening while rotating.

In a seventh application device according to any one of the first to sixth application device, the driver is arranged such that the direction of the output shaft is perpendicular to the central axis of the discharge port.

In a first application robot, the application device according to any one of the first to seventh application devices is mounted such that a tip shaft is coaxial with the central axis of the discharge port.

A first application method uses an application robot where an application device is mounted such that a tip shaft is coaxial with the central axis of a discharge port. The application device includes: a discharger having the discharge port that discharges an application material; a supporter that movably supports the discharger around the position of the discharge port; and a driver that moves the discharger. The first application method includes an application process of moving the discharger by the driver to apply the application material while keeping the discharge port in a state perpendicular to an applied surface.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An application device, comprising:

a discharger having a discharge port configured to discharge an application material;

a first supporter movably supporting the discharger around a position of the discharge port;

a first driver configured to move the discharger supported by the first supporter, the first driver having an output shaft;

a drive-side member coupled to the output shaft of the first driver; and a driven-side member disposed on the discharger, wherein the drive-side member has an opening extending in a direction perpendicular to the output shaft of the first driver, and the driven-side member has a pin inserted through the opening to transmit rotation of the drive-side member to the driven-side member.

2. The application device according to claim 1, wherein the first supporter has an arc-shaped first rail, the discharger has a base side supported by the arc-shaped first rail; and the discharger is configured to slide along the arc-shaped first rail by the first driver.

3. The application device according to claim 2, wherein the first supporter includes a protrusion configured to restrict movement of the discharger.

4. The application device according to claim 1, wherein the output shaft of the first driver is coupled to a base side of the discharger.

5. The application device according to claim 4, wherein the driven-side member is disposed on the base side of the discharger, and the drive-side member and the driven-side member are configured to transmit a power of the first driver between the drive-side member and the driven-side member.

6. The application device according to claim 5, wherein the pin has a roller inserted through the opening, and the roller is configured to linearly move along the opening in association with movement of the discharger while rotating.

7. The application device according to claim 1, wherein the first driver is arranged such that the output shaft of the first driver is perpendicular to a central axis of the discharge port.

8. The application device according to claim 2, further comprising a mounting portion secured to the first driver and the first supporter.

9. The application device according to claim 8, further comprising a second supporter having an arc-shaped second rail, the arc-shaped second rail movably supporting the mounting portion, wherein the mounting portion is configured to slide along the arc-shaped second rail.

10. The application device according to claim 9, wherein the arc-shaped second rail is configured to movably support the mounting portion around the position of the discharge port.

11. The application device according to claim 9, further comprising a second driver configured to move the mounting portion supported by the second supporter, along the arc-shaped second rail.

12. An application robot, comprising:

an arm portion; and the application device according to claim 1, the application device being mounted on the arm portion such that any rotation axis of the arm portion is coaxial with a central axis of the discharge port.

13. An application device, comprising:

a discharger having a discharge port configured to discharge an application material;

a first supporter movably supporting the discharger around a position of the discharge port;

a first driver configured to move the discharger supported by the first supporter;

a mounting portion secured to the first driver and the first supporter; and a second supporter having an arc-shaped second rail, the arc-shaped second rail movably supporting the mounting portion, wherein the first supporter has an arc-shaped first rail, the discharger is supported by the arc-shaped first rail, the discharger is configured to slide along the arc-shaped first rail by the first driver, the mounting portion is configured to slide along the arc-shaped second rail, and the arc-shaped second rail is arranged intersecting with the arc-shaped first rail.

14. The application device according to claim 13, wherein the arc-shaped second rail extends in a direction perpendicular to the arc-shaped first rail.

15. The application device according to claim 13, wherein the discharger has a base side supported by the arc-shaped first rail.

16. The application device according to claim 15, wherein the arc-shaped second rail extends in a direction perpendicular to the arc-shaped first rail.

* * * * *